(12) United States Patent
Shimizu et al.

(10) Patent No.: US 10,158,507 B2
(45) Date of Patent: *Dec. 18, 2018

(54) SIGNAL CONVERTER AND CONTROL DEVICE

(71) Applicant: Renesas Electronics Corporation, Tokyo (JP)

(72) Inventors: Yuji Shimizu, Tokyo (JP); Akane Hiroshima, Tokyo (JP); Yutaka Ono, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,508

(22) Filed: Jul. 13, 2018

(65) Prior Publication Data

US 2018/0324011 A1 Nov. 8, 2018

Related U.S. Application Data

(63) Continuation of application No. 15/806,648, filed on Nov. 8, 2017, now Pat. No. 10,044,538, which is a (Continued)

(30) Foreign Application Priority Data

Aug. 5, 2015 (JP) .................................. 2015-154994

(51) Int. Cl.
H02P 1/04 (2006.01)
H04L 27/20 (2006.01)
H04L 7/00 (2006.01)

(52) U.S. Cl.
CPC ........ H04L 27/2053 (2013.01); H04L 7/0008 (2013.01); H04L 27/20 (2013.01)

(58) Field of Classification Search
CPC ....... H04L 27/06; H04L 27/08; H04L 25/207; H04B 7/0817; H03D 1/16; H02K 29/06;
(Continued)

(56) References Cited

U.S. PATENT DOCUMENTS 3,577,050 A * 5/1971 Ringland .................. B60K 1/00
318/146
3,584,276 A * 6/1971 Ringland ................ B60L 11/08
318/721

(Continued)

FOREIGN PATENT DOCUMENTS

| JP | 08-035856 A | 2/1996 |
|---|---|---|
| JP | 08-287173 A | 11/1996 |
| JP | 2004-347612 A | 12/2004 |

*Primary Examiner* — James M Perez

(74) *Attorney, Agent, or Firm* — Mattingly & Malur, PC

(57) ABSTRACT

A signal converter 100 includes, for at least two-phase signals detected by a resolver excited by a carrier signal having a carrier frequency fc, a first phase shifter 101 that shifts a phase of a first phase signal of the resolver with a pole at a frequency f1 lower than the carrier frequency fc, a second phase shifter 102 that shifts a phase of a second phase signal of the resolver with a pole at a frequency f2 higher than the carrier frequency fc, and a synthesizer 103 that combines the phase-shifted first phase signal with the phase-shifted second phase signal.

11 Claims, 11 Drawing Sheets

Related U.S. Application Data continuation of application No. 15/484,285, filed on Apr. 11, 2017, now Pat. No. 9,832,054, which is a continuation of application No. 15/159,840, filed on May 20, 2016, now Pat. No. 9,641,367.

(58) Field of Classification Search
CPC . H02K 29/12; H02P 6/182; H02P 6/08; H02P 2209/07; H02P 6/142; H02P 6/14; H02P 6/16; G11B 19/28; G11B 19/2009; G11B 19/20
USPC ............. 318/700, 400.01–400.42, 701–724; 375/216–221, 224–236, 316–352
See application file for complete search history.

(56) References Cited

U.S. PATENT DOCUMENTS

| | | | | |
|---|---|---|---|---|
| 3,629,705 A * | 12/1971 | Walters | G01P 3/44 | 324/173 |
| 3,657,628 A * | 4/1972 | Chesney | G05B 19/42 | 242/DIG. 1 |
| 4,017,822 A * | 4/1977 | Rusch | G01S 3/8083 | 367/126 |
| 4,357,569 A * | 11/1982 | Iwakane | H02P 21/22 | 318/606 |
| 4,447,771 A * | 5/1984 | Whited | H02P 6/06 | 318/400.3 |
| 4,490,661 A * | 12/1984 | Brown | H02P 6/10 | 318/400.3 |
| 4,653,073 A * | 3/1987 | Vercellotti | H04B 3/542 | 327/90 |
| 4,661,756 A * | 4/1987 | Murphy | H02P 25/08 | 310/168 |
| 4,701,839 A * | 10/1987 | McNally | H02P 6/06 | 318/715 |
| 4,814,677 A * | 3/1989 | Plunkett | H02P 6/08 | 318/400.02 |
| 4,843,291 A * | 6/1989 | Predina | G05B 19/33 | 318/603 |
| 4,843,292 A * | 6/1989 | Ono | B25J 9/126 | 318/606 |
| 4,864,300 A * | 9/1989 | Zaremba | G01D 5/2497 | 341/6 |
| 4,943,760 A * | 7/1990 | Byrne | H02K 19/103 | 318/701 |
| 4,952,860 A * | 8/1990 | Soeda | H02P 6/16 | 318/721 |
| 4,961,038 A * | 10/1990 | MacMinn | H02P 25/098 | 318/685 |
| 4,982,147 A * | 1/1991 | Lauw | H02P 25/024 | 318/721 |
| 4,988,273 A * | 1/1991 | Faig | B29C 45/5008 | 264/40.3 |
| 5,004,965 A * | 4/1991 | Otokawa | H02P 6/10 | 318/400.04 |
| 5,006,768 A * | 4/1991 | Rozman | H02P 1/46 | 318/400.11 |
| 5,012,169 A * | 4/1991 | Ono | B25J 9/126 | 318/568.2 |
| 5,185,764 A * | 2/1993 | Baier | H04L 25/0236 | 375/231 |
| 5,214,390 A * | 5/1993 | Montreuil | H04L 5/06 | 329/306 |
| 5,271,041 A * | 12/1993 | Montreuil | H04L 25/497 | 375/326 |
| 5,362,222 A * | 11/1994 | Faig | B29C 45/7666 | 264/40.3 |
| 5,373,206 A * | 12/1994 | Lim | H02K 29/06 | 310/68 B |
| 5,406,184 A * | 4/1995 | Bahn | H02P 25/089 | 318/400.4 |
| 5,432,420 A * | 7/1995 | Bahn | H02P 3/065 | 318/376 |
| 5,485,047 A * | 1/1996 | Bahn | H02K 19/103 | 310/166 |
| 5,552,682 A * | 9/1996 | Ushikoshi | H02P 6/16 | 318/400.04 |
| 5,637,998 A * | 6/1997 | Kushihara | H03M 1/645 | 324/207.16 |
| 5,701,065 A * | 12/1997 | Ishizaki | H02P 25/03 | 318/400.17 |
| 5,723,933 A * | 3/1998 | Grundl | H02K 3/04 | 310/208 |
| 5,780,983 A * | 7/1998 | Shinkawa | H02P 6/182 | 318/400.04 |
| 5,914,578 A * | 6/1999 | Rakov | H02P 6/16 | 318/606 |
| 6,023,417 A * | 2/2000 | Hava | H02M 7/53875 | 318/811 |
| 6,137,204 A * | 10/2000 | Kuwahara | H02K 24/00 | 310/162 |
| 6,522,097 B2 * | 2/2003 | Fujimoto | H02P 6/16 | 318/605 |
| 7,075,196 B1 * | 7/2006 | Labriola, II | H02K 29/12 | 310/12.19 |
| 7,184,927 B2 * | 2/2007 | Anghel | H02P 6/181 | 318/400.02 |
| 7,282,878 B1 * | 10/2007 | Rakov | H02P 6/08 | 318/400.01 |
| 7,443,130 B2 * | 10/2008 | Takao | H02P 21/14 | 318/720 |
| 7,636,396 B1 * | 12/2009 | Weber, Jr. | H04B 3/546 | 324/126 |
| 7,723,933 B2 * | 5/2010 | Fujita | F02N 11/04 | 318/140 |
| 7,839,108 B2 * | 11/2010 | Patel | H02H 7/0852 | 318/400.01 |
| 7,863,850 B2 * | 1/2011 | Fu | G03B 27/42 | 318/400.39 |
| 7,902,775 B2 * | 3/2011 | Narumi | H02P 6/182 | 318/400.04 |
| 8,018,189 B2 * | 9/2011 | Narumi | H02P 6/18 | 318/257 |
| 8,035,322 B2 * | 10/2011 | Turner | H02P 23/14 | 318/254.1 |
| 8,237,396 B2 * | 8/2012 | Ikei | H02P 3/12 | 318/400.34 |
| 8,305,020 B2 * | 11/2012 | Suzuki | H02M 1/32 | 318/254.1 |
| 8,773,051 B2 * | 7/2014 | Gokan | H02M 1/083 | 318/400.14 |
| 9,641,367 B2 * | 5/2017 | Shimizu | H04L 27/20 | |
| 9,832,054 B2 * | 11/2017 | Shimizu | H04L 27/20 | |
| 10,044,538 B2 * | 8/2018 | Shimizu | H04L 7/0008 | |
| 2002/0152039 A1 * | 10/2002 | Fujimoto | B62D 5/046 | 702/36 |
| 2002/0175645 A1 * | 11/2002 | Fujimoto | H02P 6/16 | 318/400.04 |
| 2003/0075997 A1 * | 4/2003 | Keim | B60L 11/1803 | 310/68 D |
| 2003/0076060 A1 * | 4/2003 | Colosky | H02P 6/182 | 318/400.32 |
| 2004/0061470 A1 * | 4/2004 | Ito | H02K 29/08 | 318/565 |
| 2005/0216225 A1 * | 9/2005 | Anghel | H02P 6/181 | 702/151 |
| 2006/0071622 A1 * | 4/2006 | Townsend | B25J 9/1612 | 318/400.31 |
| 2006/0202582 A1 * | 9/2006 | Umesaki | B60K 6/26 | 310/162 |
| 2007/0216324 A1 * | 9/2007 | Liu | G01D 5/2093 | 318/400.39 |
| 2009/0108782 A1 * | 4/2009 | Klatt | B60Q 1/30 | 318/400.17 |
| 2009/0134831 A1 * | 5/2009 | Tankard | H02P 25/08 | 318/490 |
| 2009/0189555 A1 * | 7/2009 | Chen | H02P 21/0089 | 318/400.07 |

(56) References Cited

U.S. PATENT DOCUMENTS

| | | | | |
|---|---|---|---|---|
| 2009/0284194 A1* | 11/2009 | Forte | H02M 7/53871 | 318/400.02 |
| 2010/0066283 A1* | 3/2010 | Kitanaka | B60L 11/1803 | 318/400.02 |
| 2010/0259207 A1* | 10/2010 | Kitanaka | H02P 21/06 | 318/400.17 |
| 2010/0283418 A1* | 11/2010 | Fischer | H02P 6/34 | 318/400.14 |
| 2011/0050141 A1* | 3/2011 | Yeh | H02P 6/08 | 318/434 |
| 2011/0062908 A1* | 3/2011 | Kitanaka | H02P 27/08 | 318/400.22 |
| 2011/0074320 A1* | 3/2011 | Nakamura | H02P 5/74 | 318/400.02 |
| 2011/0080125 A1* | 4/2011 | Shimada | H02P 5/74 | 318/400.09 |
| 2011/0101899 A1* | 5/2011 | Manabe | G01P 3/48 | 318/400.04 |
| 2011/0199031 A1* | 8/2011 | Balazovic | H02P 23/14 | 318/400.33 |
| 2011/0266987 A1* | 11/2011 | Markunas | H02P 21/18 | 318/400.24 |
| 2012/0062160 A1* | 3/2012 | Yang | H02K 29/06 | 318/400.33 |
| 2013/0169196 A1* | 7/2013 | Markham | H02P 6/08 | 318/3 |
| 2013/0271047 A1* | 10/2013 | Imamura | B62D 5/046 | 318/400.2 |
| 2013/0336417 A1* | 12/2013 | Takei | H04B 7/10 | 375/267 |
| 2014/0022092 A1* | 1/2014 | Stouffer | A61N 1/37217 | 340/870.02 |
| 2014/0091740 A1* | 4/2014 | Suzuki | H02P 29/027 | 318/400.02 |
| 2014/0292244 A1* | 10/2014 | Kamada | B60L 1/00 | 318/400.33 |
| 2015/0060940 A1* | 3/2015 | Muto | H01L 23/49562 | 257/140 |
| 2015/0158396 A1* | 6/2015 | Walters | H02P 6/16 | 701/22 |
| 2015/0333686 A1* | 11/2015 | Nakai | H02P 21/22 | 318/400.26 |
| 2015/0357956 A1* | 12/2015 | Shimada | H02P 6/181 | 318/400.02 |
| 2017/0041168 A1* | 2/2017 | Shimizu | H04L 27/20 | |
| 2017/0222850 A1* | 8/2017 | Shimizu | H04L 27/20 | |

* cited by examiner

SIGNAL CONVERTER AND CONTROL DEVICE

CROSS-REFERENCE TO RELATED APPLICATIONS

This application is a continuation application of U.S. patent application Ser. No. 15/806,648, filed Nov. 8, 2017, which is a continuation application of U.S. patent application Ser. No. 15/484,285, filed on Apr. 11, 2017, now U.S. Pat. No. 9,832,054, which is a continuation application of U.S. patent application Ser. No. 15/159,840, filed on May 20, 2016, now U.S. Pat. No. 9,641,367, which is based upon and claims the benefit of priority from Japanese patent application No. 2015-154994, filed on Aug. 5, 2015, the disclosures of which are incorporated herein in their entirety by reference.

BACKGROUND

The present invention relates to a signal converter and a control device, and in particular, a signal converter and a control device used for controlling a motor.

As a rotation angle sensor, a resolver that detects a rotation angle of a rotor based on fluctuations in a magnetic field caused by a rotation of the rotor has been known.

Japanese Unexamined Patent Application Publications No. H8-287173 and No. H8-35856 disclose methods in which: the phase of one of two-phase resolver signals obtained by one-phase excitation is shifted by 90° by a signal converter; the phase-shifted signal is combined with the other of the two-phase resolver signals; and the angle of the resolver is detected from the combined signal. Further, Japanese Unexamined Patent Application Publication No. 2004-347612 discloses a device that detects (i.e., determines), in the angle of a resolver, whether or not there is an abnormality in the angle detection.

SUMMARY

The present inventors have found the following problem. In these methods, there has been a problem that when the rotor of the resolver rotates, the phase shift by the phase shifter deviates from 90° and hence a large error occurs in the detected angle.

Further, as a technique for shifting the phase of a resolver signal, an RD (Resolver Digital) converter has been known. The RD converter performs tracking by synchronously wave-detecting a signal synthesized from two-phase output resolver signals and a carrier signal for exciting the resolver, and feeding back a shift amount of the phase from the wave-detected signal. This RD converter requires a complicated configuration and hence has a circuit size larger than the size of those used in the methods disclosed in the Japanese Unexamined Patent Application Publications No. H8-287173 and No. H8-35856.

As described above, no signal converter having excellent detected-angle accuracy and a small circuit size has been provided in the past.

Other objects and novel features will be more apparent from the following description in the specification and the accompanying drawings.

A first aspect of the present invention is a signal converter that shifts a phase of one of two-phase outputs of a resolver having a carrier frequency fc by an amount φ1 by using a phase shifter having a pole f1, shifts a phase of the other of the two-phase outputs by an amount φ2 by using a phase shifter having a pole f2, in which the poles of the phase shifters satisfies a relation "f1<fc<f2".

It is possible to provide a signal converter having excellent detected-angle accuracy and a small circuit size.

According to the above-described aspect, it is possible to maintain a phase difference "φ2−φ1" at a constant angle of 90 degrees even when the frequency varies in a range between "fc−Δ" and "fc+Δ" (Δ is a fluctuation caused by the rotation speed of the rotor).

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
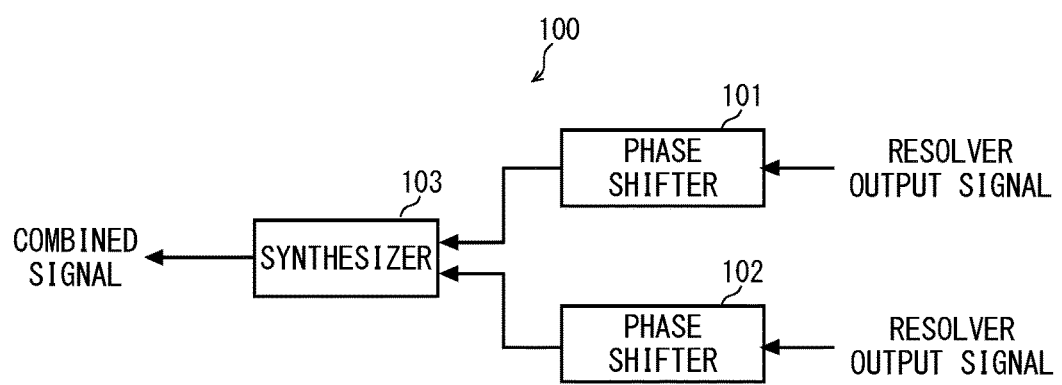
FIG. 1 is a block diagram showing a configuration of a signal converter according to an outline of an embodiment.

For clarifying the explanation, the following descriptions and the drawings may be partially omitted and simplified as appropriate. Further, each of the elements that are shown in the drawings as functional blocks for performing various processes can be implemented by hardware such as a CPU, a memory, and other types of circuits, or implemented by software such as a program loaded in a memory. Therefore, those skilled in the art will understand that these functional blocks can be implemented solely by hardware, solely by software, or a combination thereof. That is, they are limited to neither hardware nor software. Note that the same symbols are assigned to the same components throughout the drawings and duplicated explanations are omitted as required.

Outline of Embodiment

FIG. 1 is a block diagram showing a configuration of a signal converter according to an outline of an embodiment. In FIG. 1, a signal converter 100 includes a first phase shifter 101, a second phase shifter 102, and a synthesizer 103. The signal converter 100 converts at least two-phase signals output from a resolver excited at a carrier frequency fc and thereby makes the two-phase signals have a predetermined phase difference therebetween.

The first phase shifter 101 shifts the phase of a first phase signal of the resolver with a pole at a frequency f1 lower than the carrier frequency fc and outputs the phase-shifted first phase signal to the synthesizer 103.

The second phase shifter 102 shifts the phase of a second phase signal of the resolver with a pole at a frequency f2 higher than the carrier frequency fc and outputs the phase-shifted second phase signal to the synthesizer 103.

The synthesizer 103 combines the phase-shifted first phase signal with the phase-shifted second phase signal and externally outputs the synthesized signal (i.e., combined signal).

As described above, the signal converter according to the outline of the embodiment shifts the phase of the first phase signal of the resolver with the pole of the frequency f1 lower than the carrier frequency fc, shifts the phase of the second phase signal of the resolver with the pole of the frequency f2 higher than the carrier frequency fc, and combines the phase-shifted first phase signal with the phase-shifted second phase signal. As a result, it is possible to provide a signal converter having excellent detected-angle accuracy and a small circuit size.

First Embodiment

In a first embodiment, a detailed configuration of the signal converter 100 explained above in the outline of the embodiment and a control device for a motor using the signal converter 100 are explained.

Figure 2:
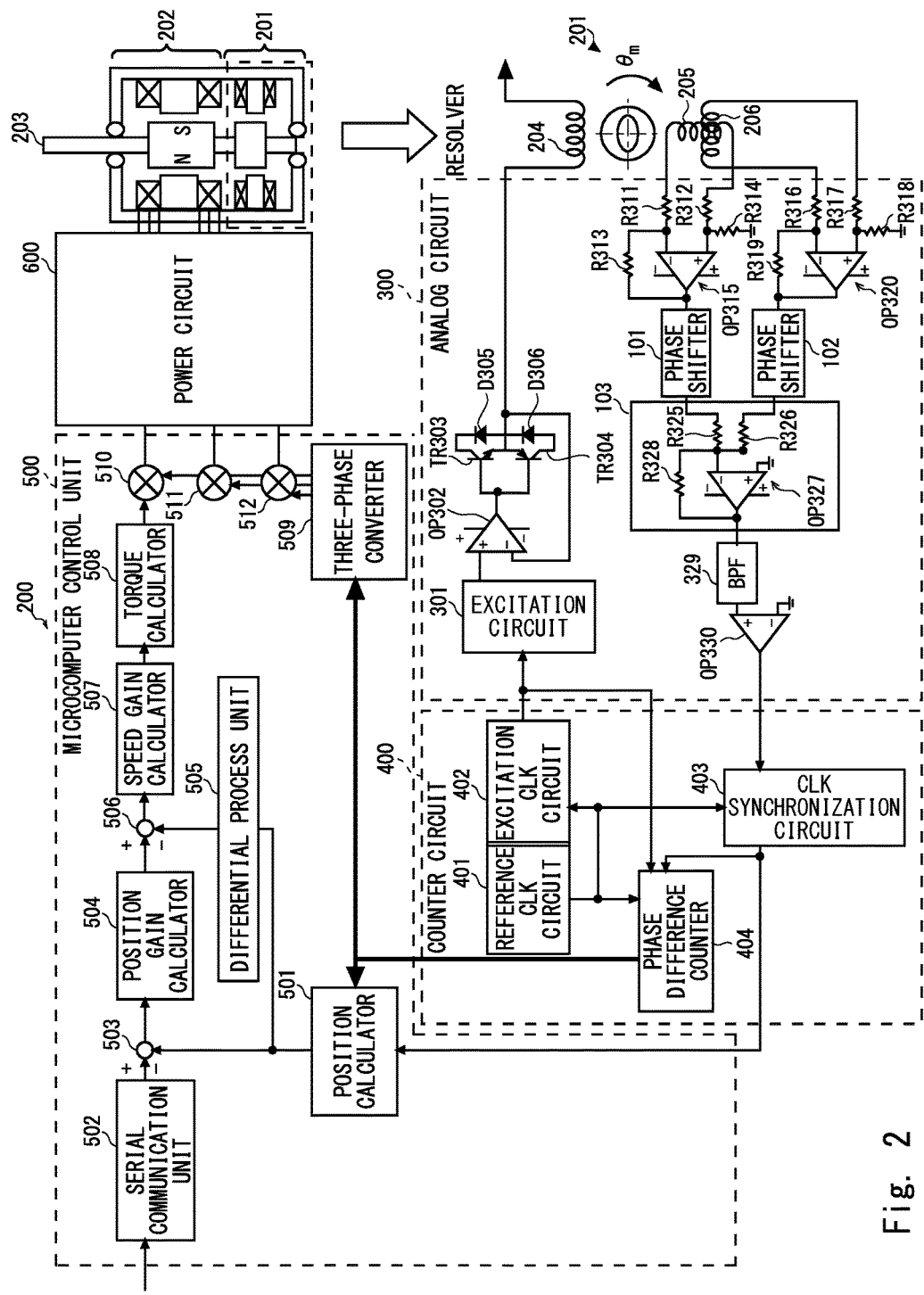
FIG. 2 is a block diagram showing a configuration of a signal converter and a control device according to a first embodiment.

Firstly, a function of each component of a signal converter and a control device according to the first embodiment is explained. FIG. 2 is a block diagram showing a configuration of a control device according to the first embodiment.

In FIG. 2, a control device 200 includes an analog circuit 300, a counter circuit 400, a microcomputer controller 500, and a power circuit 600. Further, the control device 200 controls the rotation of a motor 202 based on signals from a resolver 201. The rotor sections of the resolver 201 and the rotor section of the motor 202 are both fixed on a common rotation shaft 203 and hence the resolver 201 and the motor 202 rotate in a synchronized manner.

The resolver 201 further includes an excitation coil 204, a detection coil 205, and a detection coil 206. The excitation coil 204 is a coil that generates a magnetic field by an electric signal supplied to the excitation coil 204. The detection coils 205 and 206 are coils that detect fluctuations in the magnetic field and output the detected fluctuations as an electric signal.

The excitation coil 204, the detection coil 205, and the detection coil 206 are disposed in the stator section of the resolver 201 and fluctuations in the magnetic field are detected by the rotation of the rotor section of the resolver 201. However, any device or structure that can detect fluctuations in a magnetic field by the rotation of a rotor as at least two-phase electric signals may be used as the resolver 201. For example, the excitation coil 204 may be disposed in the rotor section and the detection coils 205 and 206 may be disposed in the stator section, and fluctuations in the magnetic field may be detected by the rotation of the rotor section.

Further, the detection coils 205 and 206 are disposed with a predetermined angle therebetween, so that the detection coils 205 and 206 detect a fluctuation in the magnetic field as signals having mutually-different phases. For example, the detection coils 205 and 206 are disposed with an angle of 90° therebetween, so that the detection coil 205 detects a fluctuation in the magnetic field as a sine wave and the detection coil 206 detects it as a cosine wave.

Next, a configuration of the analog circuit 300 is explained. The analog circuit 300 includes an excitation circuit 301, a phase shifter 101, a phase shifter 102, a band-pass filter 329, OP amplifiers OP302, OP315, OP320, OP327 and OP330, transistors TR303 and TR304, diodes D305 and D306, and resistors R311, R312, R313, R314, R316, R317, R318, R319, R325, R326 and R328.

The excitation circuit 301 generates a cosine-wave carrier signal having a frequency fc, which is obtained by frequency-dividing a reference clock signal, and outputs the generated carrier signal to the OP amplifier OP302.

The OP amplifier OP302, the push-pull-connected transistors TR303 and T304, and the diodes D305 and D306 amplify the carrier signal and output the amplified carrier signal to the excitation coil 204 of the resolver 201.

The OP amplifier OP315 and the resisters R311, R312, R313 and R314 form a differential amplifier, and amplify a signal detected by the detection coil 205 and output the amplified signal to the phase shifter 101. Similarly, the OP amplifier OP320 and the resisters R316, R317, R318 and R319 form a differential amplifier, and amplify a signal detected by the detection coil 206 and output the amplified signal to the phase shifter 102.

The outputs of the phase shifters 101 and 102 are connected to each other through the resistors R325 and R326, respectively, so that a signal that is obtained by modulating the phase of the carrier frequency by the rotation angle of the rotor is provided. Details of the signal synthesis are described later.

The OP amplifier OP 327 and the resistor R328 form an inverting amplifier circuit, and amplify the signal obtained by modulating the phase of the carrier frequency by the rotation angle of the rotor and output the amplified signal to the band-pass filter 329.

The band-pass filter 329 attenuates signal components of the phase-modulated signal outside a predetermined frequency range and outputs the resultant signal to the OP amplifier OP330. The predetermined frequency range is, for example, a frequency range in which the carrier frequency can be changed according to the rotation speed of the rotor.

The OP amplifier OP330 forms a comparator, and shapes the phase-modulated signal into a square wave and outputs the shaped signal to a CLK synchronization circuit 403.

Next, a configuration of the counter circuit 400 is explained. The counter circuit 400 includes a reference CLK circuit 401, an excitation CLK circuit 402, a phase difference counter 404, and the CLK synchronization circuit 403.

The reference CLK circuit 401 generates a signal having a reference frequency and outputs the generated reference clock signal to the excitation CLK circuit 402, the phase difference counter 404, and the CLK synchronization circuit 403.

The excitation CLK circuit 402 divides the frequency of the reference clock signal generated by the reference CLK circuit 401 and thereby outputs a clock signal having a carrier frequency, which is obtained by the frequency-division, to the excitation circuit 301 and the phase difference counter 404.

The CLK synchronization circuit 403 synchronously wave-detects the shaped phase-modulated signal and the shaped carrier signal and outputs the wave-detected signal to the phase difference counter 404 and a position calculator 501.

The phase difference counter 404 counts (or measures) a phase difference obtained by the synchronous wave-detection with the resolution of the reference frequency and outputs the count result to the position calculator 501 and a three-phase converter 509.

Next, a configuration of the microcomputer controller 500 is explained. The microcomputer controller 500 includes the position calculator 501, a serial communication unit 502, a subtracter 503, a position gain calculator 504, a differential process unit 505, a subtracter 506, a speed gain calculator 507, a torque calculator 508, the three-phase converter 509, and multipliers 510, 511 and 512.

The position calculator 501 calculates a position detection value from the wave-detected signal and the count result of the phase difference and outputs the calculated position detection value to the subtracter 503 and the differential process unit 505.

The serial communication unit 502 receives an external position command signal and outputs the received position command signal to the subtracter 503. The subtracter 503 subtracts the position command signal from the position detection value and outputs the obtained position deviation to the position gain calculator 504.

The position gain calculator 504 calculates the target speed of the motor 202 by multiplying the position deviation by a predetermined position gain. The differential process unit 505 calculates the rotation speed of the motor 202 by differentiating a detected signal representing the rotational position. The subtracter 506 subtracts the speed detection value from the target speed and outputs the obtained speed deviation to the speed gain calculator 507.

The speed gain calculator 507 calculates a torque command value by multiplying the speed deviation by the speed gain. The torque calculator 508 calculates current command values representing currents that should be fed to the respective phases of the motor 202 from the torque command value. The three-phase converter 509 generates three-phase signals from the count result of the phase difference and outputs the generated three-phase signals to the respective multipliers 510, 511 and 512.

The multipliers 510, 511 and 512 generate three-phase control signals by multiplying the respective current command values by the three-phase signals and output the generated three-phase control signals to the power circuit 600. The power circuit 600 is an inverter that performs three-phase PWM (Pulse Width Modulation) control for the motor 202 based on the three-phase control signals.

Figure 3:
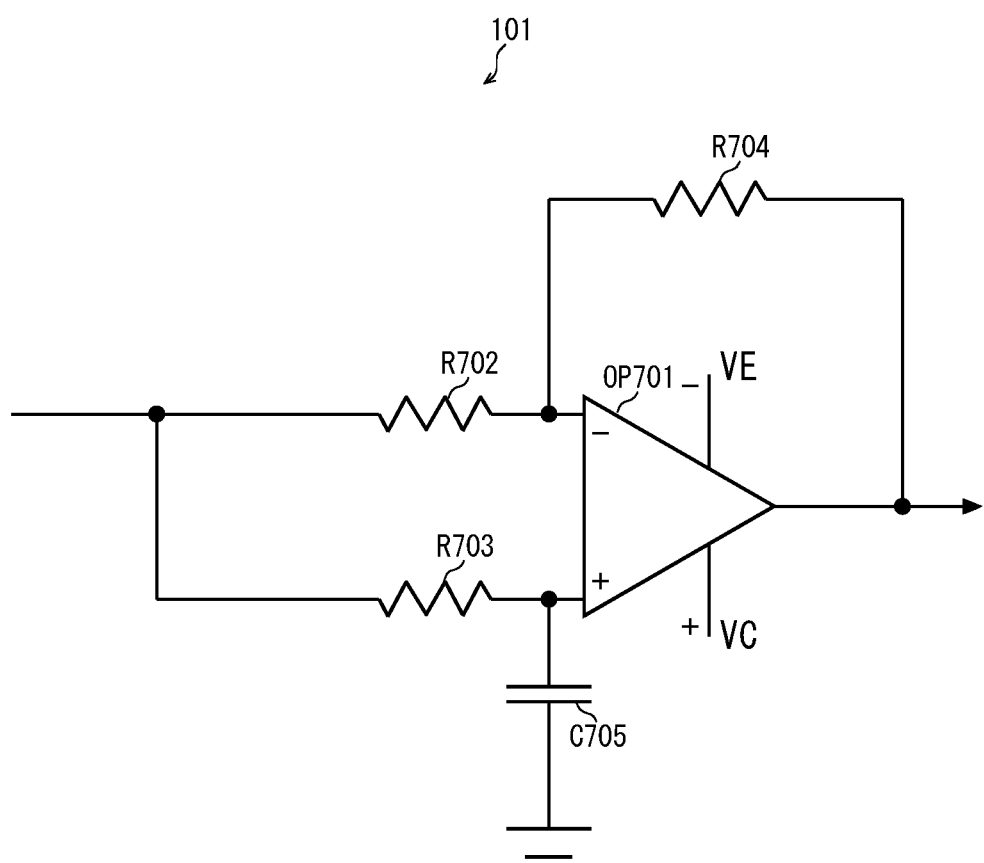
FIG. 3 is a circuit diagram showing a configuration of a phase shifter according to the first embodiment.

With the above-described configuration, the control device 200 detects the rotation angle of the rotor and controls the motor. However, it should be noted that any configuration capable of shifting a phase can be used as each of the phase shifters 101 and 102, which are components disposed in the control device 200. For example, an all-pass filter using an OP amplifier is a preferred configuration capable of shifting a phase. This phase shifter using an OP amplifier is explained with reference to FIG. 3. FIG. 3 is a circuit diagram showing a configuration of a phase shifter according to the first embodiment. In FIG. 3, the phase shifter 101 includes an OP amplifier OP701, resistors R702 and R703, and a capacitor C705.

A signal output from the detection coil 205 of the resolver 201 is input to the inverting input terminal of the OP amplifier OP701 through the resistor R702 and also input to the non-inverting input terminal of the OP amplifier OP701 through the resistor R703. Further, the non-inverting input terminal of the OP amplifier OP701 is connected to the ground through the capacitor C705. Further, the output terminal of the OP amplifier OP701 is connected to the inverting input terminal of the OP amplifier OP701.

With the above-described configuration, the phase shifter 101 forms an all-pass filter using an OP amplifier. A similar configuration can be used for the phase shifter 102.

The phase shift and the pole can be determined by the transfer function of the all-pass filter. Therefore, the impedance of the resistor R703 and the capacitance of the capacitor C705 are determined based on a desired phase shift and a desired pole.

Note that the difference between the phase shifts of the phase shifters 101 and 102 can be adjusted to 90° by adjusting the carrier frequency fc, the frequency f1 of the pole of the phase shifter 101, and the frequency f2 of the pole of the phase shifter 102 so that they satisfy relations "f1=fc/n" and "f2=fc×n" (n is an arbitrary positive real number).

For example, by adjusting the impedance of each of the resistors R702, R703 and R704 to 100 kΩ and adjusting the capacitance of the capacitor C705 to 80 pF, the frequency f1 can be adjusted to 1.99 kHz (f1=1.99 kHz). Further, by adjusting the impedance of each of the resistors R702, R703 and R704 to 100 kΩ and adjusting the capacitance of the capacitor C705 to 135 pF, the frequency f2 can be adjusted to 11.8 kHz (f1=11.8 kHz).

When the carrier frequency fc is 4.88 kHz (fc=4.88 kHz), the above-described frequencies f1 and f2 (f1=1.99 kHz, f2=11.8 kHz) satisfy the relations "f1=fc/n" and "f2=fc×n" (n is an arbitrary positive real number). Therefore, the difference between the phase shifts of the phase shifters 101 and 102 becomes 90°.

Next, a process for detecting a rotation angle is explained with reference to FIG. 2. Firstly, a carrier signal generated by the excitation circuit 301 is amplified by the OP amplifier OP302 and the transistors TR303 and TR304, and the amplified carrier signal is input to the excitation coil 204.

The magnetic field generated by the excitation coil 204 fluctuates due to the rotation of the rotor section of the resolver 201. Then, the fluctuations in the magnetic field are detected by the detection coils 205 and 206.

For example, when the excitation coil 204 is one-phase-excited by a carrier signal having a sine wave $\sin \omega t$ and two-phase output signals detected by the detection coils 205 and 206 are amplified, the amplified two-phase output signals X1 and X2 are defined as follows.

$$X1 = K \cdot \sin \theta m \times \sin \omega t$$

$$X2 = K \cdot \cos \theta m \times \sin \omega t$$

In the above-shown expressions: $\omega$ is the angular momentum of the carrier signal; t is a time; $\theta m$ is the rotation angle of the rotor of the resolver 201; and K is the gain of the OP amplifiers OP315 and OP317.

Here, when the phase shifts of the phase shifters 101 and 102 are represented by φ1 and φ2, respectively, and an all-pass filter is used for each of the phase shifters 101 and 102, the signal converter 100 can be designed so that a relation "φ1−φ2=−90°" is satisfied. For example, by adjusting the frequencies of the poles of the phase shifters 101 and 102 to 1.99 kHz and 11.8 kHz, respectively, for the carrier frequency fc of 4.88 kHz (fc=4.88 kHz), the relation "φ1−φ2=−90°" can be satisfied.

Further, the filtered signals in the phase shifters 101 and 102 are defined as follows.

$$X1 = K \cdot \sin\theta m \times \sin(\omega t - \varphi 1)$$

$$X2 = K \cdot \cos\theta m \times \sin(\omega t - \varphi 2)$$

Here, the following relation can be derived from the relation "−φ2=−φ1−90°".

$$X2 = K \cdot \cos\theta m \times \sin(\omega t - \varphi 1 - 90°)$$

$$= -K \cdot \cos\theta m \times \cos(\omega t - \varphi 1)$$

In the synthesizer 103, the signals X1 and X2, which are phase-shifted in the phase shifters 101 and 102, are combined with each other. Here, the following relation can be derived by adding X1 and X2.

$$Y = X1 + X2$$

$$= K \cdot \sin\theta m \times \sin(\omega t - \varphi 1) - K \cdot \cos\theta m \times \cos(\omega t - \varphi 1)$$

$$= -K \cdot \cos(\omega t - \varphi 1 + \theta m)$$

Figure 4:
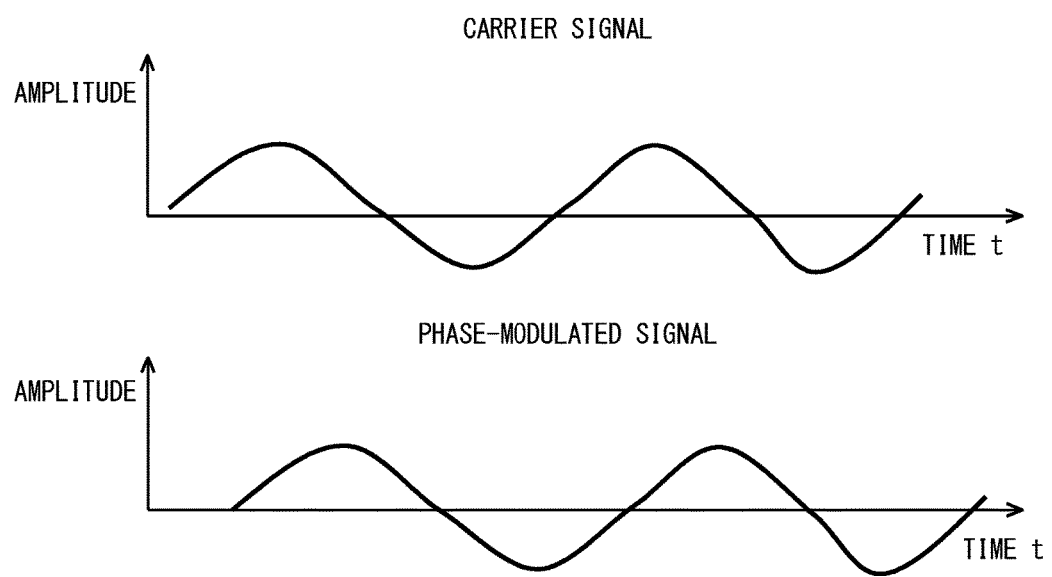
FIG. 4 is a graph showing an example of a carrier signal and a phase-modulated signal.

That is, a signal that is obtained by modulating the phase of the carrier frequency (angular frequency) ω by the rotation angle θm of the rotor is provided. FIG. 4 is a graph showing an example of the carrier signal and the phase-modulated signal. In FIG. 4, the vertical axis indicates amplitudes and the horizontal axis indicates time. As shown in FIG. 4, the carrier signal and the phase-modulated signal are signals having the same frequency and different phases. Therefore, it is possible to calculate the rotation angle of the rotor based on the phase difference between the carrier signal and the phase-modulated signal.

Figure 5:
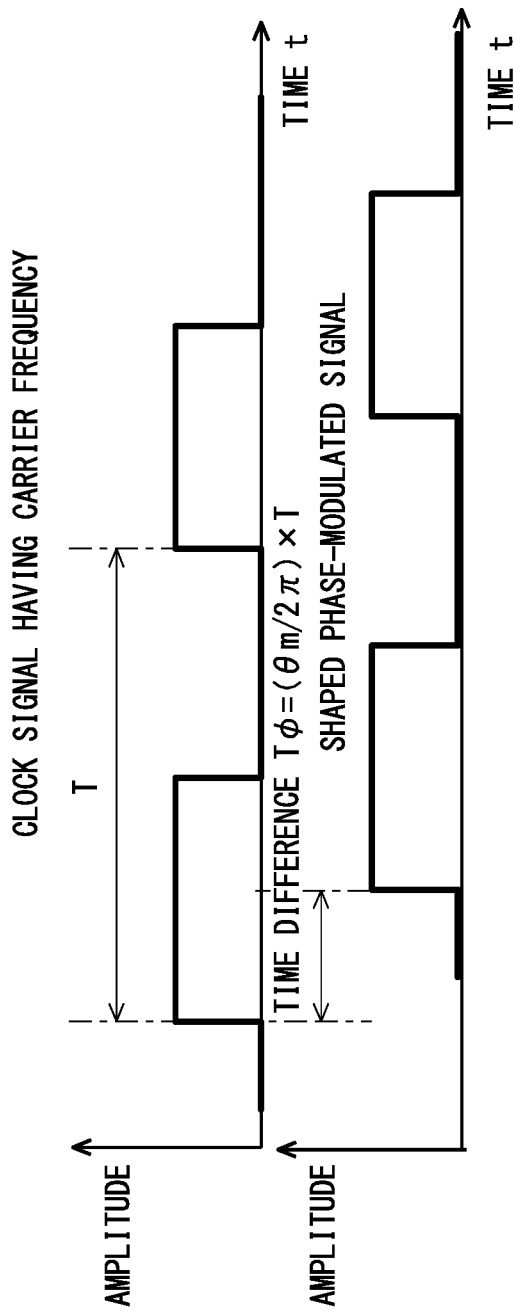
FIG. 5 is a graph showing a phase difference between a clock signal of a carrier frequency and a shaped phase-modulated signal.

An example of a preferred method is a method in which the phase-modulated signal is shaped into a square wave and the phase difference between the shaped phase-modulated signal and the clock signal having the carrier frequency is detected. FIG. 5 is a graph showing a phase difference between the clock signal having the carrier frequency and the shaped phase-modulated signal. In FIG. 5, the vertical axis indicates amplitudes and the horizontal axis indicates time. As shown in FIG. 5, there is a phase difference between the clock signal having the carrier frequency and the shaped phase-modulated signal, which corresponds to the rotation angle of the rotor.

In the CLK synchronization circuit 403, a wave-detected signal is obtained by synchronizing the signal that is obtained by modulating the phase of the carrier frequency ω by the rotation angle θm of the rotor with the clock signal having the carrier frequency.

The motor is controlled based on the obtained detected signal in the microcomputer controller 500 and the power circuit 600.

Next, the accuracy of the rotation angle, which is detected through the above-described series of processes, is explained. As described above, the rotation angle θm of the rotor is obtained by adjusting the phase shifts φ1 and φ2 in the phase shifters 101 and 102, respectively, so that the relation "φ1−φ2=−90°" (or "φ1−φ2=90°") is satisfied.

Therefore, the farther the value "φ1−φ2" deviates from −90°, the larger the error of the detected angle becomes. Further, the closer the value "φ1−φ2" is to −90°, the smaller the error of the detected angle becomes.

That is, it is possible to accurately detect the rotation angle of the rotor by maintaining the difference between the phase shifts by the two phase shifters at −90° even when the frequency of the two-phase output signals from the resolver changes due to the rotation speed of the rotor.

Figure 6:
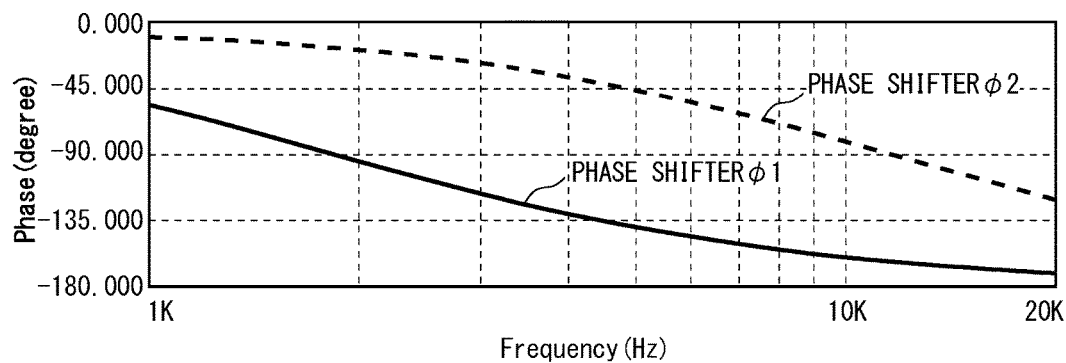
FIG. 6 is a graph showing a relation between frequencies detected by a detection coil of a resolve and phase shifts by a phase shifter in the signal converter according to the first embodiment.

FIG. 6 is a graph showing a relation between frequencies detected by the detection coils of the resolve and the phase shifts by the phase shifters in the signal converter according to the first embodiment. In FIG. 6, the horizontal axis indicates the frequency (Hz) of the two-phase output signals detected by the detection coils 205 and 206, and the vertical axis indicates the phase shifts (degrees) by the phase shifters. As shown in FIG. 6, the phase shifter 101 has its pole at a frequency of 1.99 kHz (f1=1.99 kHz) and the phase shifter 102 has its pole at a frequency of 11.8 kHz (f2=11.8 kHz).

Figure 7:
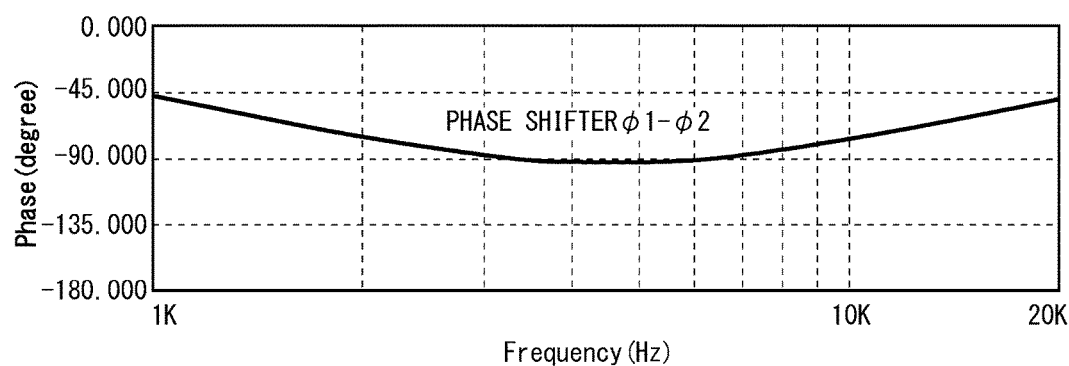
FIG. 7 is a graph showing a relation between frequencies detected by the detection coil of the resolve and differences between phase shifts by two phase shifters in the signal converter according to the first embodiment.

In the first embodiment, the difference between the phase shifts by the two phase shifters is maintained roughly at −90°. FIG. 7 is a graph showing a relation between frequencies detected by the detection coils of the resolve and the difference between the phase shifts by the two phase shifters in the signal converter according to the first embodiment. In FIG. 7, the horizontal axis indicates the frequency (Hz) of the two-phase output signals detected by the detection coils 205 and 206, and the vertical axis indicates the phase shifts (degrees) by the two phase shifters.

As shown in FIG. 7, the difference between the phase shifts by the two phase shifters is maintained roughly at −90° in a range of 4.88 kHz±1 kHz.

Figure 8:
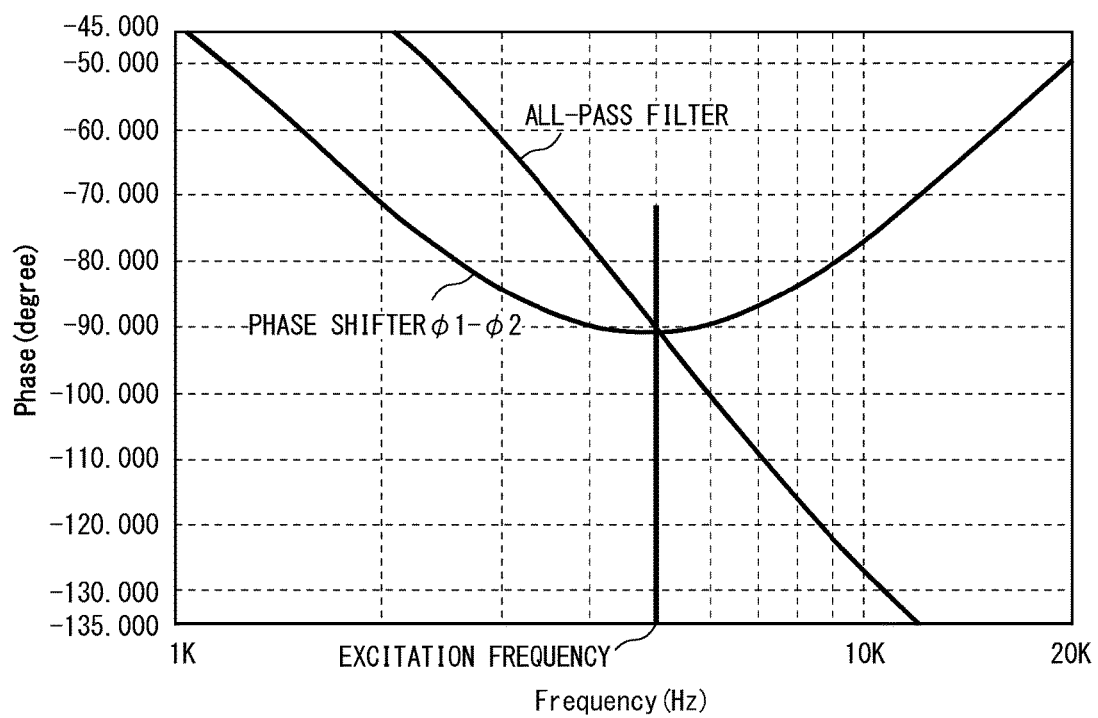
FIG. 8 is a graph for comparing a relation between frequencies detected by a detection coil of a resolve and differences between phase shifts by phase shifters in the signal converter according to the first embodiment with a relation between them in an all-pass filter.

Here, a difference between fluctuations in the two phase shifters and those in one all-pass filter is explained. FIG. 8 is a graph for comparing a relation between frequencies detected by the detection coils of the resolve and differences between phase shifts by the phase shifters in the signal converter according to the first embodiment with a relation between them in one all-pass filter. In FIG. 8, the horizontal axis indicates the frequency (Hz) of the two-phase output signals detected by the detection coils 205 and 206, and the vertical axis indicates the phase shifts (degrees).

As shown in FIG. 8, in the case where one all-pass filter is used, when the carrier frequency shifts by 1 kHz from 4.88 kHz, the phase shift changes from −90° to −100°, i.e., changes by 10°. In contrast to this, in the first embodiment, when the frequency of the two-phase output signals from the resolver shifts by 1 kHz from 4.88 kHz, i.e., from the carrier frequency, the change in the phase shift from −90° is no more than 1°.

As described above, the signal converter according to the first embodiment can maintain the difference between the phase shifts by the two phase shifters at −90° even when the frequency of the two-phase output signals from the resolver changes due to the rotation of the rotor and hence can accurately detect the rotation angle of the rotor.

Further, the signal converter according to the first embodiment does not require the circuit that feeds back the phase difference and corrects the phase difference, which is required in the tracking method, thus making it possible to reduce the circuit size.

Further, in the signal converter according to the first embodiment, there is no need to feedback the phase difference and correct the phase difference, which is required in the tracking method, thus making it possible to detect the position in a shorter time than that in the tracking method.

Further, the signal converter according to the first embodiment can include a band-pass filter that lets the phase-modulated signal pass therethrough in a frequency range in which the carrier frequency is changed according to the rotation speed of the rotor and thereby remove the drive current noise caused by the magnetic circuit of the motor and the PWM modulation noise of the inverter, thus making it possible to achieve an accurate signal conversion.

Further, since the signal converter according to the first embodiment is simple and its circuit size is small, the interface between the signal converter and a microcomputer can be easily constructed. Therefore, by incorporating the signal converter according to the first embodiment into a microcomputer device, it is possible to improve the accuracy of a brushless motor, reduce the price thereof, and reduce the size thereof.

Figure 9:
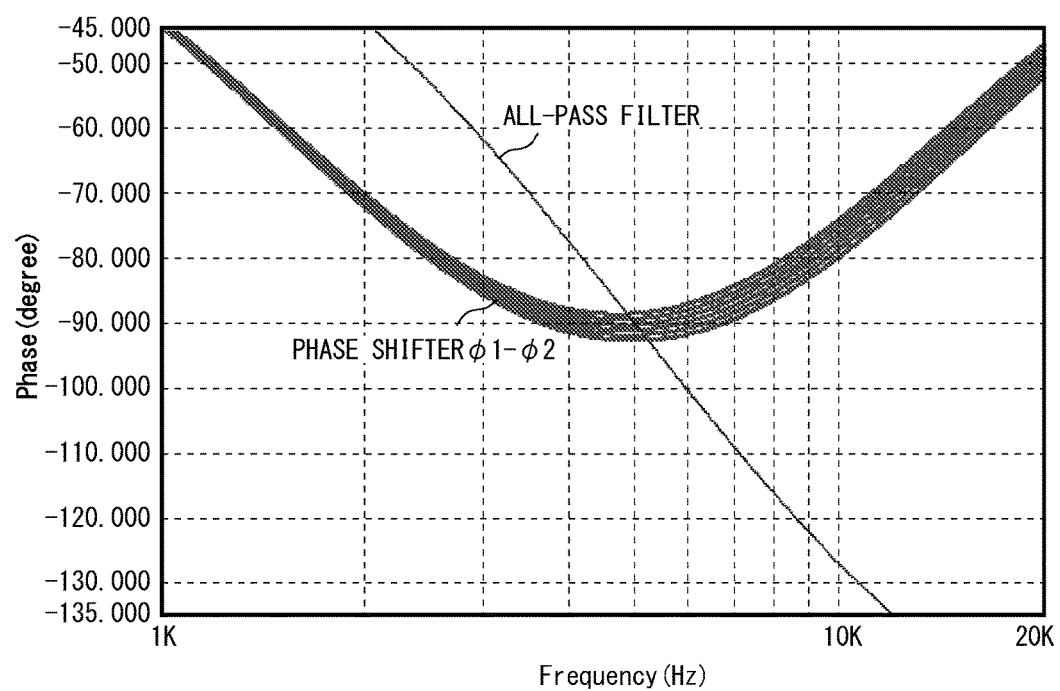
FIG. 9 is a graph showing a relation between frequencies detected by the detection coil of the resolve and differences between phase shifts by two phase shifters in the signal converter according to the first embodiment.

Note that the difference "φ1−φ2" between the phase shifts by the two phase shifters may be roughly 90° (i.e., does not have to be exactly 90°), provided that it is in the range of the permissible error in the detection of the rotation angle of the rotor. FIG. 9 is a graph showing a relation between frequencies detected by the detection coils of the resolve and differences between the phase shifts by the two phase shifters in the signal converter according to the first embodiment. In FIG. 9, the horizontal axis indicates the frequency (Hz) of the two-phase output signals detected by the detection coils 205 and 206, and the vertical axis indicates the phase shifts (degrees) by the two phase shifters.

In FIG. 9, an example where the phase shift by the phase shifter 102 is changed and the difference "φ1−φ2" between the phase shifts by the two phase shifters is thereby changed from −88° to −92° is shown. When the frequency of the two-phase output signals from the resolver shifts by 1 kHz from 4.88 kHz, i.e., from the carrier frequency, the change in the phase shift from −90° is no more than 2°. That is, the error in the phase shift is one fifth of that in the example where one all-pass filter is used.

Therefore, the value of the difference "φ1−φ2" may be roughly −90° (i.e., does not have to be exactly −90°). Specifically, the value of the difference "φ1−φ2" is considered to be roughly −90° even when it is any value in a range of −88° to −92°, and it is considered to be practically accurate enough for the detection of the rotation angle of the rotor.

Note that the difference "φ1−φ2" means a relative difference between the two phases. Therefore, −90° and 90° are practically the same as each other except for their expressions which are changed according to the order of the two phases. That is, either of them can be applied, provided that they mean the same phase difference. This also holds true for the case where the difference "φ1−φ2" is in the range of −88° to −92°.

Second Embodiment

Figure 10:
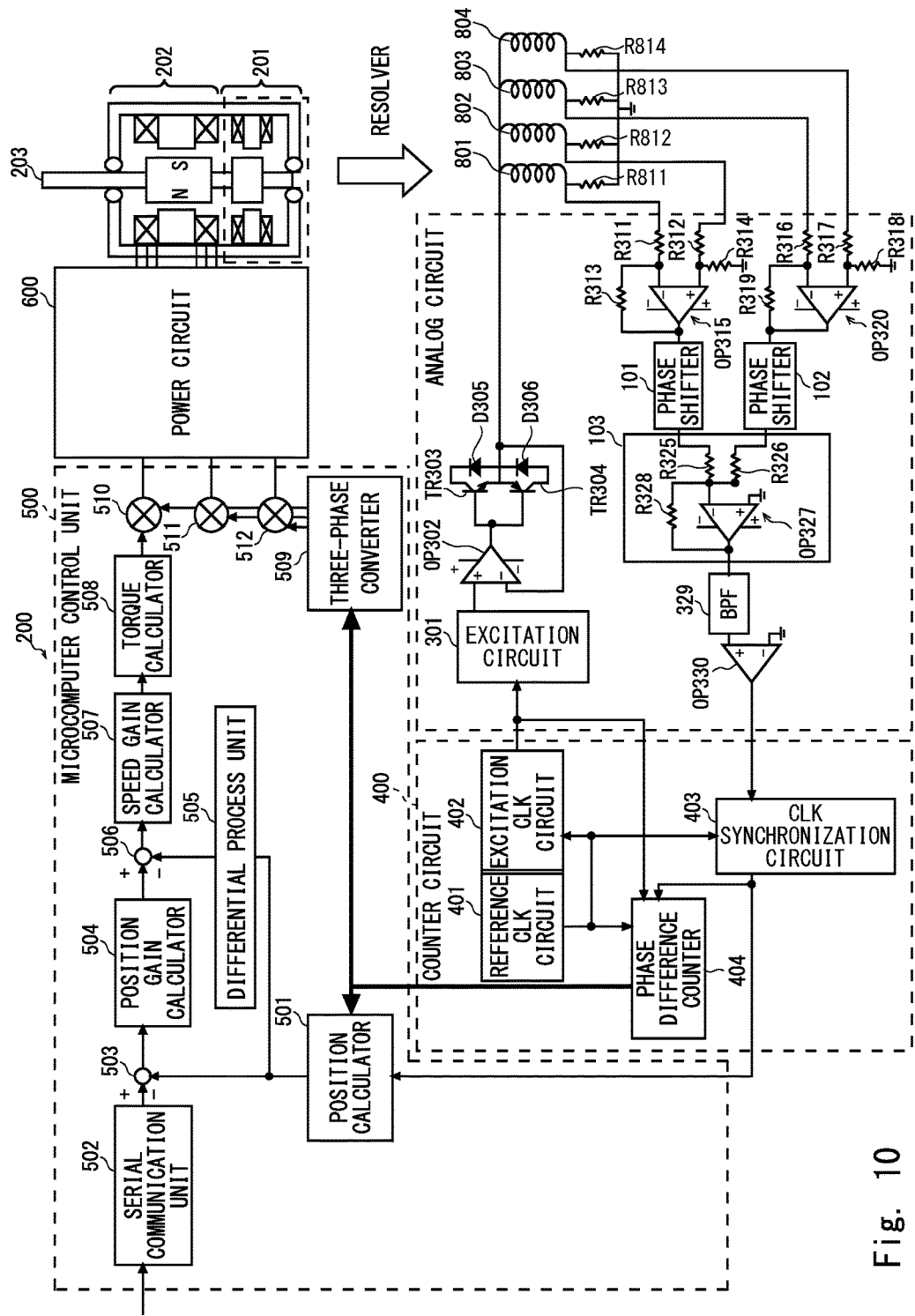
FIG. 10 is a block diagram showing a configuration of a signal converter and a control device according to a second embodiment.

In a second embodiment, an example in which four-phase coils are used in the resolver is explained. FIG. 10 is a block diagram showing a configuration of a signal converter and a control device according to the second embodiment.

In FIG. 10, the same reference numbers as those in FIG. 2 are assigned to the same components as those in FIG. 2, and their explanations are omitted. In FIG. 10, a control device 800 includes coils 801, 802, 803 and 804, and resistors R811, R812, R813 and R814.

The excitation circuit 301 generates a cosine-wave carrier signal having a frequency fc, which is obtained by frequency-dividing a reference clock signal, and outputs the generated carrier signal to the OP amplifier OP302. The OP amplifier OP302, the push-pull-connected transistors TR303 and T304, and the diodes D305 and D306 amplify the carrier signal and output the amplified carrier signal to the coils 801, 802, 803 and 804 of the resolver 201.

One end of the coil 801 is connected to the output of an amplifier circuit formed by the OP amplifier OP302 and the push-pull-connected transistors TR303 and T304 and the other end of the coil 801 is connected to the inverting input terminal of the OP amplifier OP315.

Further, one end of the coil 803 is connected to the output of the amplifier circuit formed by the OP amplifier OP302 and the push-pull-connected transistors TR303 and T304 and the other end of the coil 803 is connected to the non-inverting input terminal of the OP amplifier OP315.

The OP amplifier OP315 forms a differential amplifier that differentially-amplifies the outputs of the 0-phase coil 801 and the 180-phase coil 803.

Similarly, one end of the coil 802 is connected to the output of the amplifier circuit formed by the OP amplifier OP302 and the push-pull-connected transistors TR303 and T304 and the other end of the coil 802 is connected to the inverting input terminal of the OP amplifier OP320.

Further, one end of the coil 804 is connected to the output of the amplifier circuit formed by the OP amplifier OP302 and the push-pull-connected transistors TR303 and 1304 and the other end of the coil 804 is connected to the non-inverting input terminal of the OP amplifier OP320.

The OP amplifier OP320 forms a differential amplifier that differentially-amplifies the outputs of the 90-phase coil 802 and the 270-phase coil 804.

As describe above, the signal converter and the control device according to the second embodiment can accurately detect the rotation angle of the rotor by using the four-phase coils. (Third embodiment)

If the winding in the resolver is not uniform, a carrier signal having a fixed phase remains in the phase-modulated signal as a carrier error component, thus becoming a significant cause for a position error. In a third embodiment, an example in which the noise caused by the carrier signal is removed is explained.

When no carrier component is included in the value "X1+X2" obtained by combining the two-phase signals of the resolver, the speed is constant. When a carrier component is included in the aforementioned value due to an error of the winding of the resolver or the like, an AC (Alternating Current) fluctuation component is superposed on the speed. The speed including the fluctuation component is called a "speed ripple Vr".

Figure 11:
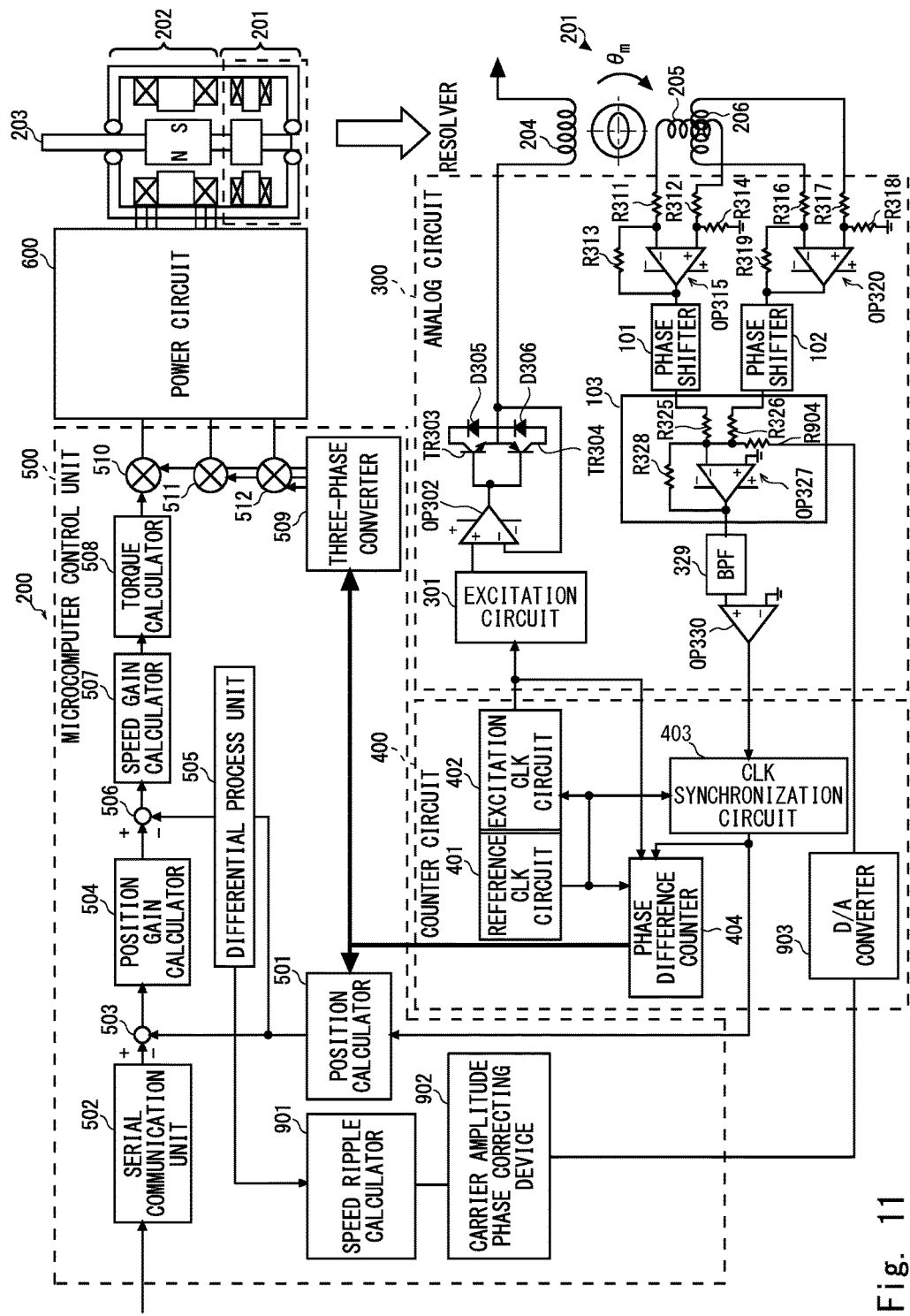
FIG. 11 is a block diagram showing a configuration of a signal converter and a control device according to a third embodiment.

FIG. 11 is a block diagram showing a configuration of a signal converter and a control device according to the third embodiment. In FIG. 11, the same reference numbers as those in FIG. 2 are assigned to the same components as those in FIG. 2, and their explanations are omitted. In FIG. 11, a control device 900 includes a speed ripple calculator 901, a carrier amplitude phase correcting unit 902, a D/A (Digital/Analog) converter 903, and a resistor R904.

The speed ripple calculator 901 calculates a ripple component from a differential value of the detected signal indicating the rotational position calculated by the differential process unit 505 and outputs the calculated ripple component to the carrier amplitude phase correcting unit 902.

The carrier amplitude phase correcting unit 902 generates a correction signal and outputs the generated correction signal to the D/A converter 903. Further, the carrier amplitude phase correcting unit 902 arbitrarily changes the phase and the amplitude of the correction signal so that the ripple component is minimized. The operation for changing the phase and the amplitude of the correction signal is described later.

The D/A converter 903 converts the digital correction signal into an analog signal and outputs the analog correction signal to the inverting input terminal of the OP amplifier OP327 through the resistor R904.

That is, a signal that is obtained by superposing the outputs of the phase shifters 101 and 102 and the output of the D/A converter 903 on each other is input to the inverting input terminal of the OP amplifier OP327.

Figure 12:
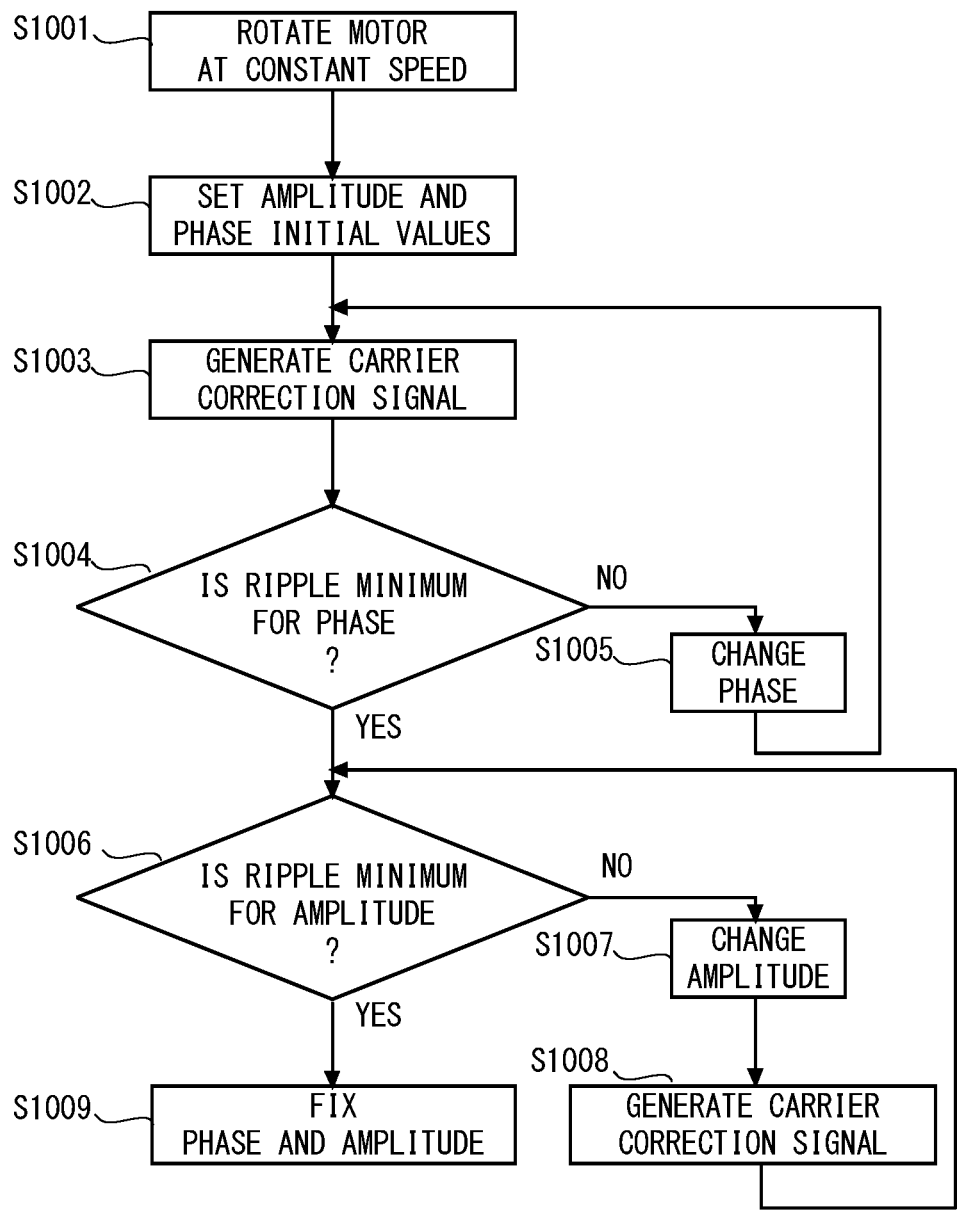
FIG. 12 is a flowchart showing an example of operations of the signal converter and the control device according to the third embodiment.

Next, operations of the signal converter and the control device according to the third embodiment are explained. FIG. 12 is a flowchart showing an example of operations of the signal converter and the control device according to the third embodiment.

Firstly, in a step S1001, the motor 202 is continuously rotated at a constant speed and the process proceeds to a step S1002.

In the step S1002, initial values for the amplitude ε and the phase Δ are set in the carrier amplitude phase correcting unit 902 and the process proceeds to a step S1003.

In the step S1003, a carrier correction signal is generated with the amplitude ε and the phase Δ in the carrier amplitude phase correcting unit 902 and the process proceeds to a step S1004.

In the step S1004, it is determined whether or not the speed ripple Vr is the minimum for the phase Δ in the speed ripple calculator 901. When the speed ripple Vr is not the minimum for the phase Δ, the process proceeds to a step S1005, whereas when the speed ripple Vr is the minimum for the phase Δ, the process proceeds to a step S1006.

In the step S1005, the phase Δ is changed in the carrier amplitude phase correcting unit 902 and the process returns to the step S1003.

In the step S1006, it is determined whether or not the speed ripple Vr is the minimum for the amplitude ε in the speed ripple calculator 901. When the speed ripple Vr is not the minimum for the amplitude s, the process proceeds to a step S1007, whereas when the speed ripple Vr is the minimum for the amplitude s, the process proceeds to a step S1009.

In the step S1007, the amplitude ε is changed in the carrier amplitude phase correcting unit 902 and the process proceeds to the step S1008.

In the step S1008, a carrier correction signal is generated with the amplitude ε and the phase Δ in the carrier amplitude phase correcting unit 902 and the process returns to the step S1006.

In the step S1009, a carrier correction signal is generated while keeping the amplitude ε and the phase Δ at fixed values in the speed ripple calculator 901 and the process for setting the amplitude ε and the phase Δ is finished.

The above-described operation is a calibration operation performed at when the product is shipped, and hence may be performed only once. Therefore, the values set for the phase Δ and the amplitude ε may be stored in a nonvolatile memory included in the microcomputer controller 500. Further, the above-described operation may be performed after the shipment. For example, the above-described operation may be performed during the initialization operation upon the power-up or the like.

As described above, the signal converter and the control device according to the third embodiment can remove the noise caused by the carrier signal of the resolver by generating a correction signal that cancels out the ripple component caused by the carrier signal, searching for a phase and an amplitude for the correction signal by which the ripple component is minimized, and superposing the correction signal on the phase-modulated signal.

Note that in each of the above-described embodiments, the counter circuit 400 and the microcomputer controller 500 can be implemented by hardware such as an ASIC (Application Specific Integrated Circuit) or software. Further, a part of the process may be implemented by software and the rest of the process may be implemented by hardware. When the process is implemented by software, a program(s) related to functional block processes may be executed in a computer system including one or a plurality of CPUs (Central Processing Units) such as a microprocessor.

Further, the above-described program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

The present invention made by the inventors has been explained above in a specific manner based on embodiments. However, the present invention is not limited to the above-described embodiments, and needless to say, various modifications can be made without departing from the spirit and scope of the present invention.

For example, each of the carrier frequency and the phase shift is not limited to the values in the above-described embodiments.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A method for converting signals by a resolver comprising the steps of:
    detecting two-phase signals excited by a carrier signal having a carrier frequency fc;
    shifting a phase of a first phase signal of the resolver with a pole at a frequency f1 lower than the carrier frequency fc;
    shifting a phase of a second phase signal of the resolver with a pole at a frequency f2 higher than the carrier frequency fc; and
    combining the phase-shifted first phase signal with the phase-shifted second phase signal and outputting a phase-modulated signal where the carrier signal is modulated by a rotation angle of the resolver.

2. The method for converting signals according to claim 1, wherein each of the first and second phase shifting includes all-pass filtering.

3. The method for converting signals according to claim 1, wherein relations "f1=fc/n" and "f2=fc×n" (where n is an arbitrary positive real number) are satisfied.

4. The method for converting signals according to claim 1, wherein a difference between a phase shift φ1 by the first phase shifting and a phase shift φ2 by the second phase shifting is roughly 90°.

5. The method for converting signals according to claim 1, further comprising the step of:
band-pass filtering that attenuates, for the phase-modulated signal, a signal component outside a predetermined frequency range centered on the carrier frequency fc.

6. The method for converting signals according to claim 1, wherein, for four-phase signals having phases mutually different from one another by roughly 90°, detected by the resolver excited by the carrier frequency fc, further comprising the steps of:
shifting a phase of a signal obtained by combining first and third phase signals of the resolver, the first and third phase signals having phases different from each other by roughly 180°, and
shifting a phase of a signal obtained by combining second and fourth phase signals of the resolver, the second and fourth phase signals having phases different from each other by roughly 180°.

7. The method for converting signals according to claim 1, further comprising the steps of:
generating a correction signal for cancelling out a ripple component caused by the carrier signal of the resolver; and
superposing the correction signal on the phase-modulated signal.

8. The method for converting signals according to claim 1, further comprising the steps of:
synchronously wave-detecting the phase-modulated signal at the carrier frequency fc and outputting a synchronously wave-detected signal;
calculating a ripple component based on a differential value of a synchronously wave-detected signal;
generating a correction signal with a phase and an amplitude by which the ripple component is minimized; and
superposing the correction signal on the phase-modulated signal.

9. A method for controlling a motor comprising the steps of:
detecting two-phase signals excited by a carrier signal having a carrier frequency fc,
shifting a phase of a first phase signal of the resolver with a pole at a frequency f1 lower than the carrier frequency fc;
shifting a phase of a second phase signal of the resolver with a pole at a frequency f2 higher than the carrier frequency fc;
combining the phase-shifted first phase signal with the phase-shifted second phase signal and outputs a phase-modulated signal where the carrier signal is modulated by a rotation angle of the resolver;
synchronously wave-detecting the phase-modulated signal at the carrier frequency fc and outputting a synchronously wave-detected signal; and
controlling the motor based on the synchronously wave-detected signal.

10. The method for controlling a motor according to claim 9, wherein, for four-phase outputs having phases mutually different from one another by roughly 90°, detected by the resolver excited by the carrier frequency fc, further comprising the steps of:
shifting a phase of a signal obtained by combining first and third phase signals of the resolver, the first and third phase signals having phases different from each other by roughly 180°; and
shifting a phase of a signal obtained by combining second and fourth phase signals of the resolver, the second and fourth phase signals having phases different from each other by roughly 180°.

11. The method for controlling a motor according to claim 9, further comprising the steps of:
generating a correction signal for cancelling out a ripple component caused by the carrier signal of the resolver; and
superposing the correction signal on the phase-modulated signal.

* * * * *